(12) United States Patent
Diab

(10) Patent No.: US 8,245,056 B2
(45) Date of Patent: Aug. 14, 2012

(54) UNIFIED BUS ARCHITECTURE FOR POE COMMUNICATION AND CONTROL

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1036 days.

(21) Appl. No.: 12/179,476

(22) Filed: Jul. 24, 2008

(65) Prior Publication Data

US 2010/0023785 A1 Jan. 28, 2010

(51) Int. Cl.
*G06F 1/26* (2006.01)
*G06F 13/00* (2006.01)

(52) U.S. Cl. ........................... 713/300; 710/241
(58) Field of Classification Search .................. 713/300; 710/113, 241; 370/389, 410, 254
See application file for complete search history.

(56) References Cited

U.S. PATENT DOCUMENTS

| | | | | |
|---|---|---|---|---|
| 5,418,967 A * | 5/1995 | Simcoe et al. | ................ | 710/241 |
| 6,037,857 A * | 3/2000 | Behrens et al. | ................ | 375/257 |
| 6,167,403 A * | 12/2000 | Whitmire et al. | ............ | 709/223 |
| 6,662,234 B2 * | 12/2003 | Cheng | ........................... | 709/250 |
| 7,051,215 B2 * | 5/2006 | Zimmer et al. | ............... | 713/300 |
| 7,117,272 B2 * | 10/2006 | Rimboim et al. | ............. | 709/250 |
| 7,228,442 B2 * | 6/2007 | Kinstler | ....................... | 713/300 |
| 7,352,770 B1 * | 4/2008 | Yonge et al. | ................... | 370/445 |
| 7,400,062 B2 * | 7/2008 | Pincu et al. | .................... | 307/29 |
| 7,484,109 B2 * | 1/2009 | Feldman et al. | .............. | 713/300 |
| 7,612,470 B2 * | 11/2009 | Pincu et al. | ...................... | 307/85 |
| 7,627,398 B1 * | 12/2009 | Bennett et al. | ................ | 700/286 |
| 7,660,345 B2 * | 2/2010 | Yu | ................................. | 375/222 |
| 7,701,092 B1 * | 4/2010 | Parker et al. | .................. | 307/154 |
| 7,707,309 B2 * | 4/2010 | Shanbhag et al. | ............ | 709/244 |
| 7,761,719 B2 * | 7/2010 | Ghoshal et al. | ............... | 713/300 |
| 7,788,518 B2 * | 8/2010 | Biederman et al. | ........... | 713/340 |
| 7,843,670 B2 * | 11/2010 | Blaha et al. | ...................... | 361/18 |
| 2005/0272402 A1 * | 12/2005 | Ferentz et al. | ................ | 455/402 |
| 2006/0117089 A1 * | 6/2006 | Karam | ........................ | 709/208 |
| 2006/0168459 A1 * | 7/2006 | Dwelley et al. | ............... | 713/300 |
| 2007/0110360 A1 * | 5/2007 | Stanford | ........................ | 385/14 |
| 2008/0030185 A1 * | 2/2008 | Metsker et al. | ............... | 323/304 |
| 2008/0267212 A1 * | 10/2008 | Crawley et al. | ............... | 370/463 |
| 2009/0273238 A1 * | 11/2009 | Apfel | .............................. | 307/31 |
| 2009/0327558 A1 * | 12/2009 | Landry et al. | ................. | 710/301 |
| 2010/0005320 A1 * | 1/2010 | Squillante | ..................... | 713/300 |

* cited by examiner

*Primary Examiner* — Paul R Myers
*Assistant Examiner* — Trisha Vu
(74) *Attorney, Agent, or Firm* — Sterne, Kessler, Goldstein & Fox p.l.l.c.

(57) ABSTRACT

Embodiments of a unified communication and control bus architecture for Ethernet and/or PoE systems are provided. Embodiments enable a unified communication and control bus architecture that significantly simplifies communication and control in Ethernet and/or PoE systems. Embodiments enable significant savings both in terms of cost and complexity as the number of communication and control buses is reduced down to one. Embodiments can be used in various Ethernet and/or PoE implementations, including, for example, single PCB-single PoE, single PCB-multiple PoE, chassis-based switch, and stackable-based switch configurations. Further, embodiments can be implemented using standard Ethernet as well as proprietary implementations.

25 Claims, 10 Drawing Sheets

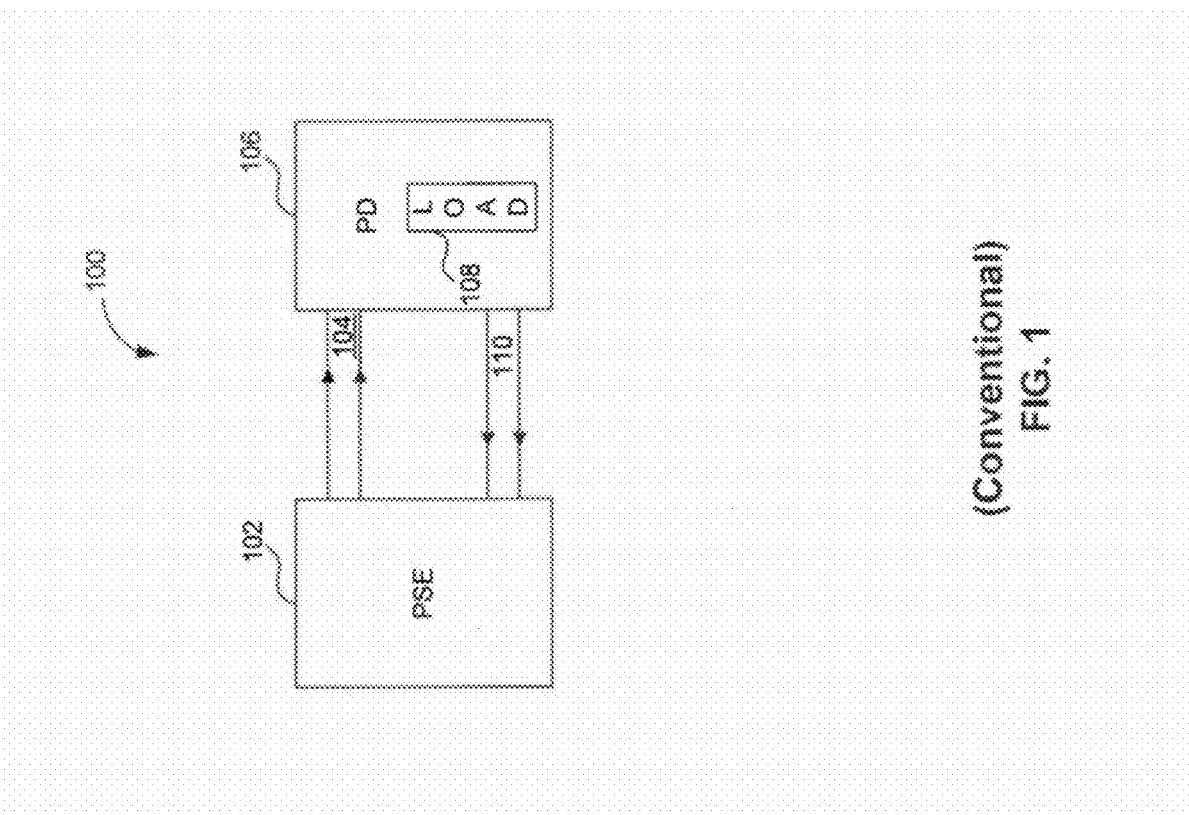
(Conventional)
FIG. 1

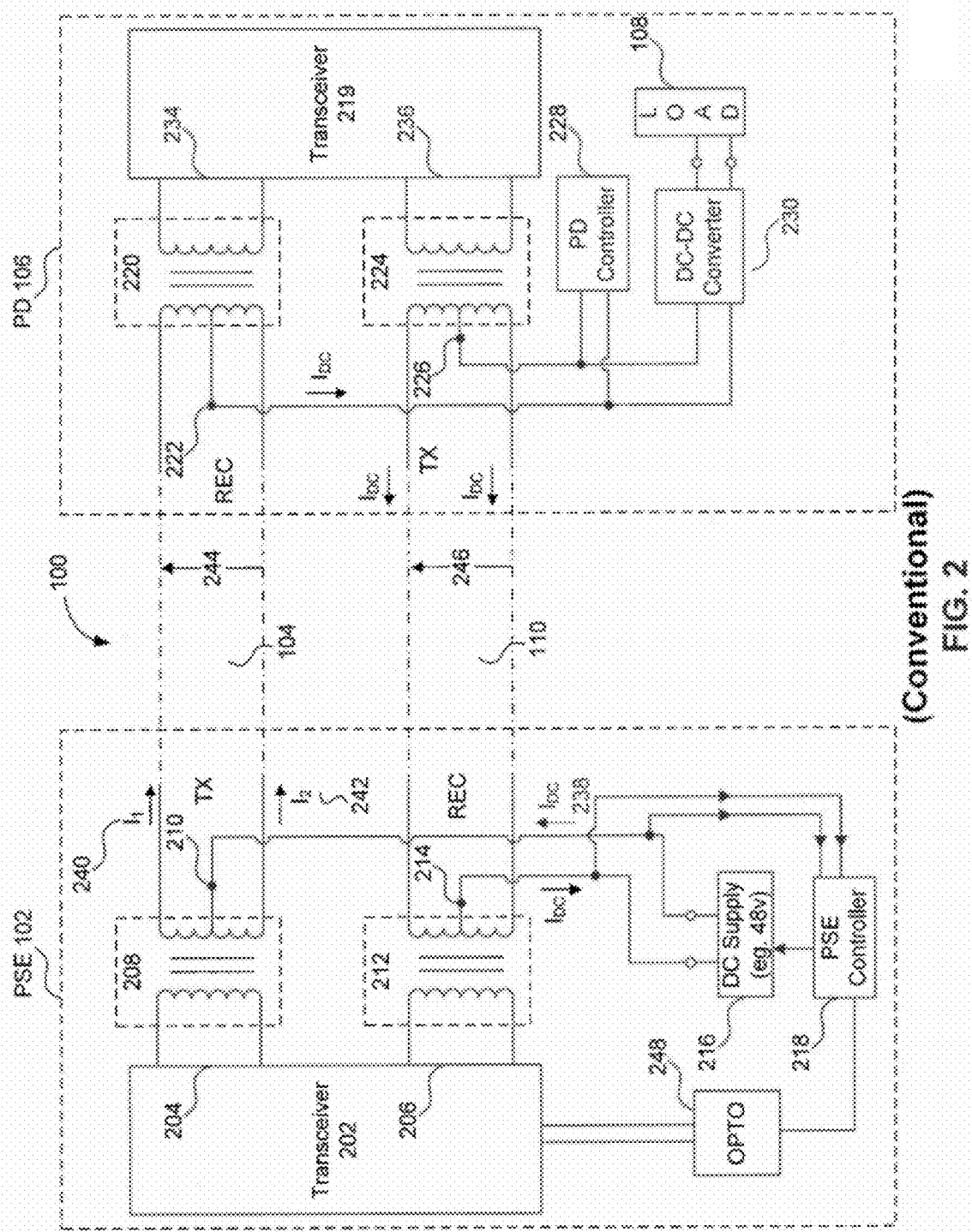
FIG. 2 (Conventional)

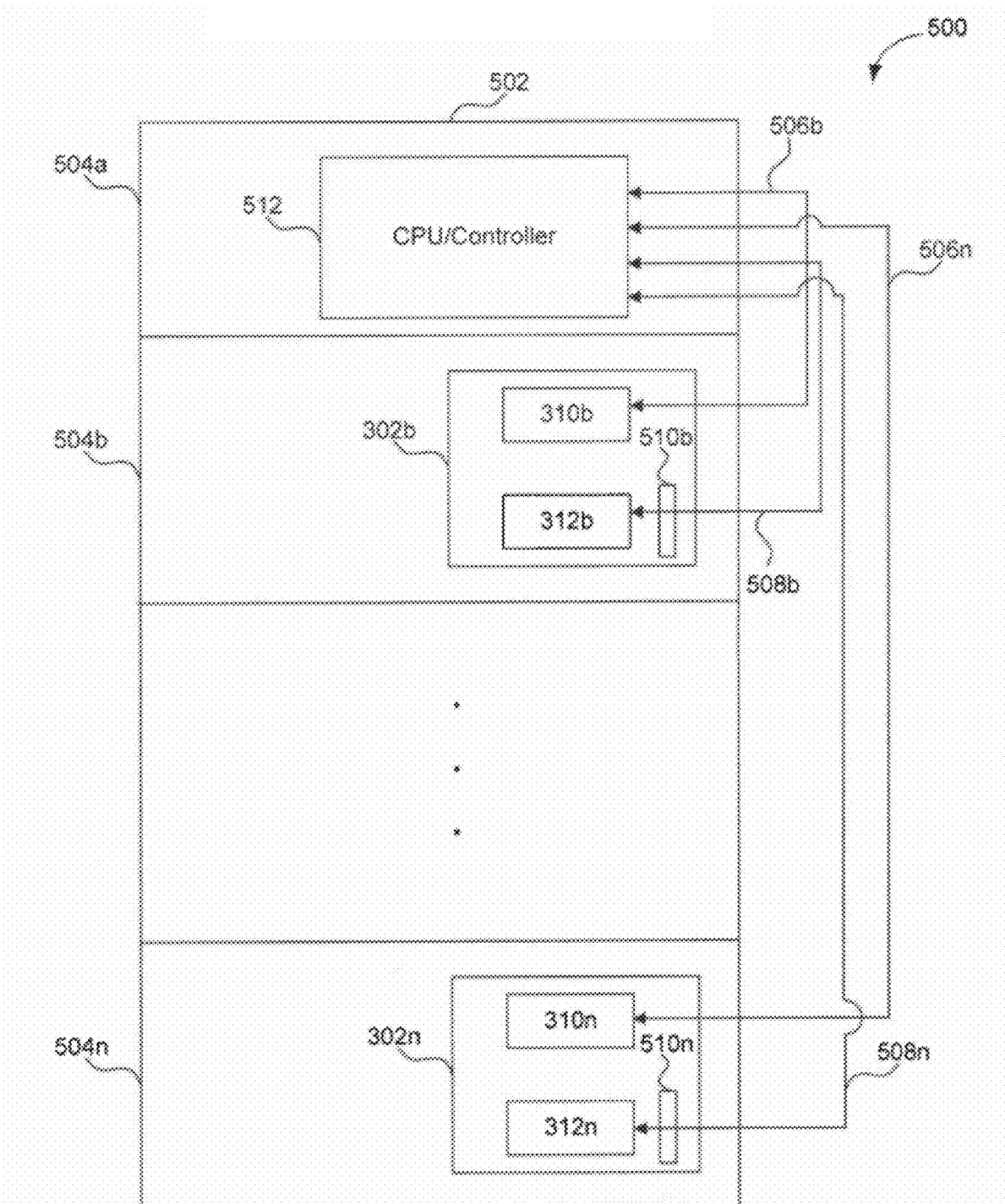
(Conventional)
FIG. 5

UNIFIED BUS ARCHITECTURE FOR POE COMMUNICATION AND CONTROL

BACKGROUND OF THE INVENTION

1. Field of the Invention

The present invention relates generally to Power over Ethernet (PoE), and more particularly to a unified bus architecture for PoE communication and control.

2. Background Art

Ethernet communications provide high speed communications between data terminals.

Power over Ethernet (PoE) systems enable power transmission over the same transmission lines that carry data in an Ethernet link. Generally, power is generated at a Power Source Equipment (PSE) side of the PoE system and is carried over an Ethernet cable to a Powered Device (PD) side of the PoE system.

As a result of enabling simultaneous power and data transmission, PoE systems have an isolated side and a non-isolated side, where the isolated side includes data subsystems and the non-isolated side includes power supply subsystems.

The isolated and non-isolated sides of a PoE system have different power requirements. Therefore, communication with the isolated side and communication with the non-isolated side are performed via separate communication buses. This implementation, however, is both expensive and complex, particularly when the number of PoE systems being controlled increases.

There is a need therefore for simplified and more efficient architectures for communication and control in PoE systems.

BRIEF SUMMARY

Embodiments of a unified communication and control bus architecture for Ethernet and/or PoE systems are provided.

Embodiments enable a unified communication and control bus architecture that significantly simplifies communication and control in Ethernet and/or PoE systems. In particular, embodiments enable a communication and control architecture with a single bus for controlling all subsystems in an Ethernet and/or PoE system, notwithstanding differences between the subsystems. For example, embodiments allow for the use of a single bus to communicate with both PHY/Data subsystems and PoE subsystems in a PoE system, notwithstanding the different power requirements between the two types of subsystems.

Embodiments enable significant savings both in terms of cost and complexity as the number of communication and control buses is reduced down to one. For example, with a single communication and control bus according to embodiments, a single control structure (i.e., software and hardware control paths, addressing scheme, etc.) is needed to communicate between a system controller and the subsystems, and communication from the system controller's perspective is reduced to the single task of addressing frames to their destination. Further, significant savings can be achieved in terms of the number of pins and ports at the system controller and/or at the subsystems that are needed for communication and control.

Embodiments can be used in various Ethernet and/or PoE implementations, including, for example, single PCB-single PoE, single PCB-multiple PoE, chassis-based switch, and stackable-based switch configurations. Further, embodiments can be implemented using standard Ethernet as well as proprietary implementations.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 is a block diagram of a conventional Power over Ethernet (PoE) system.

FIG. 2 illustrates a more detailed illustration of a conventional PoE system.

FIG. 5 illustrates a conventional communication and control bus architecture in a chassis having a centralized controller and multiple PoE linecards.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Introduction

Figure 3:
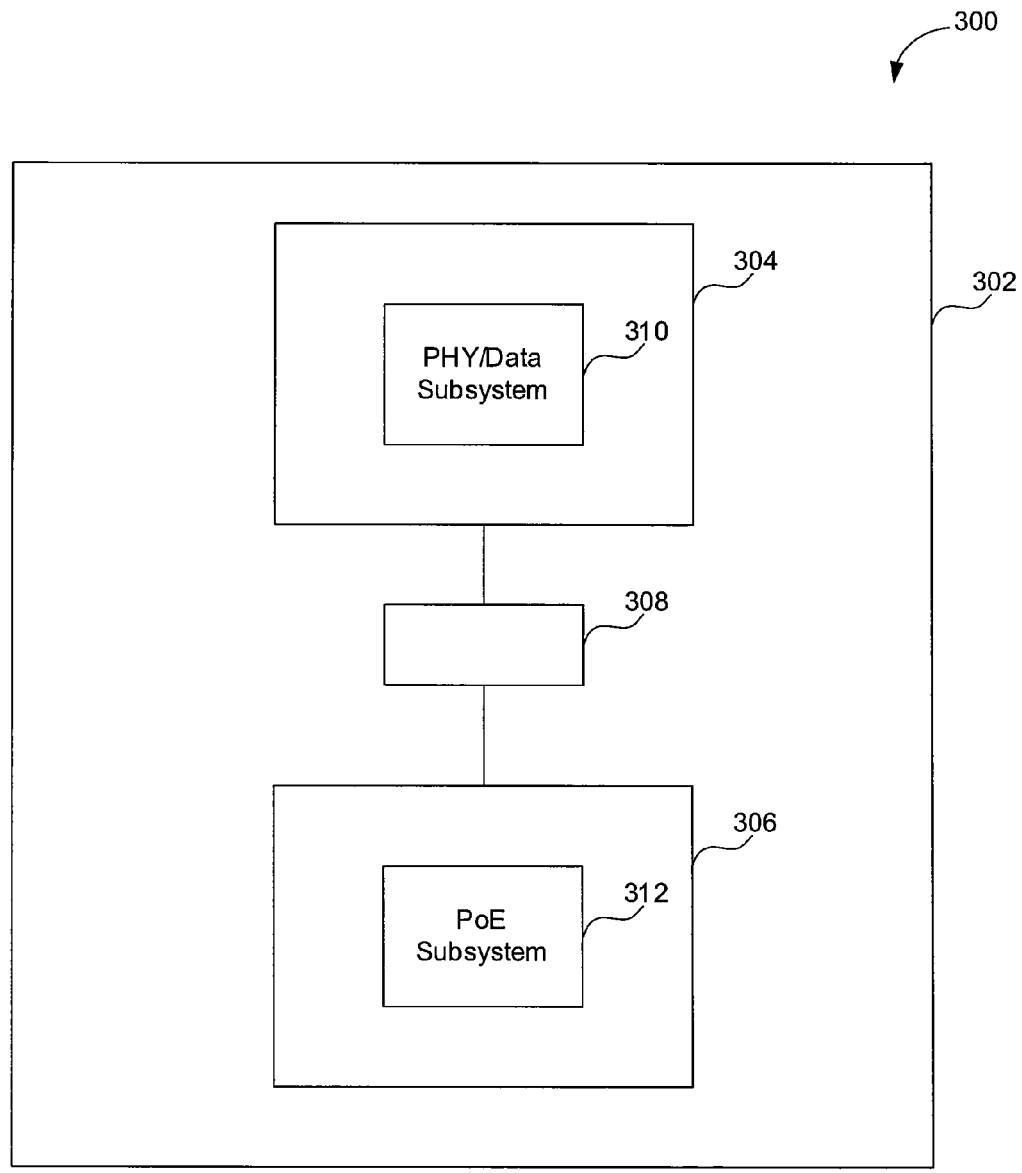
FIG. 3 illustrates an example PoE linecard.

FIG. 1 illustrates a high level diagram of a conventional Power over Ethernet (PoE) system 100 that provides both DC power and data communications over a common data communications medium. Referring to FIG. 1, power source equipment 102 provides DC power over conductors 104, 110 to a powered device (PD) 106 having a representative electrical load 108.

The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3 standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not effected by the DC power transfer.

PoE Communication and Control

A detailed description of a PoE system, including a PSE and a PD, has been provided in FIGS. 1 and 2 above. In particular, the coupling at the PSE side of the PoE system between data ports 204 and 206 of transceiver/PHY 202 and DC supply 216 has been described to identify the required isolation between two subsystems that can be found at the PSE side. Indeed, a PoE system at the PSE side generally includes an isolated side and a wire or non-isolated side, which typically operate at different power requirements. This is illustrated, for example, in FIG. 3, which shows an example PoE system 302. PoE system 302 can be used at the PSE side of a PoE arrangement. As shown in FIG. 3, PoE system 302 includes an isolated side 304 and a non-isolated side 306. Typically, the isolated side 304 includes a PHY/Data subsystem 310, which includes, for example, a transceiver such as transceiver 202 and/or Ethernet data subsystems. The non-isolated side 306 includes a PoE subsystem 312, which includes, for example, PoE power circuitry such as DC Supply 216 and PSE Controller 218.

Having different power requirements, the isolated side 304 and the non-isolated side 306 of PoE system 302 need to be electrically isolated from one another. For this reason, for example, the coupling between data ports 204 and 206 of transceiver 202 and conductor pairs 104 and 110 occurs through transformers 208 and 212. Further, any communication between the isolated side 304 and the non-isolated side 306 must be done through an isolation device 308. In FIG. 2, for example, communication between transceiver 202 and PSE Controller 218 occurs via an opto-isolator 248, which enables a serial communications interface between the two. Other types of isolation devices may also be used to enable this serial communications interface between transceiver 202 and PSE Controller 218. Further detail can be found in commonly owned U.S. patent application Ser. No. 12/168,577, titled "High Speed Isolation Interface for Use in Power Source Equipment (PSE) System," filed Jul. 7, 2008.

In addition to communication between the isolated side 304 and the non-isolated side 306 in a PoE system (which generally includes configuration and status polling by the isolated side), generally both sides need to communicate with a CPU/Controller, which provides them with command and control information.

Figure 4:
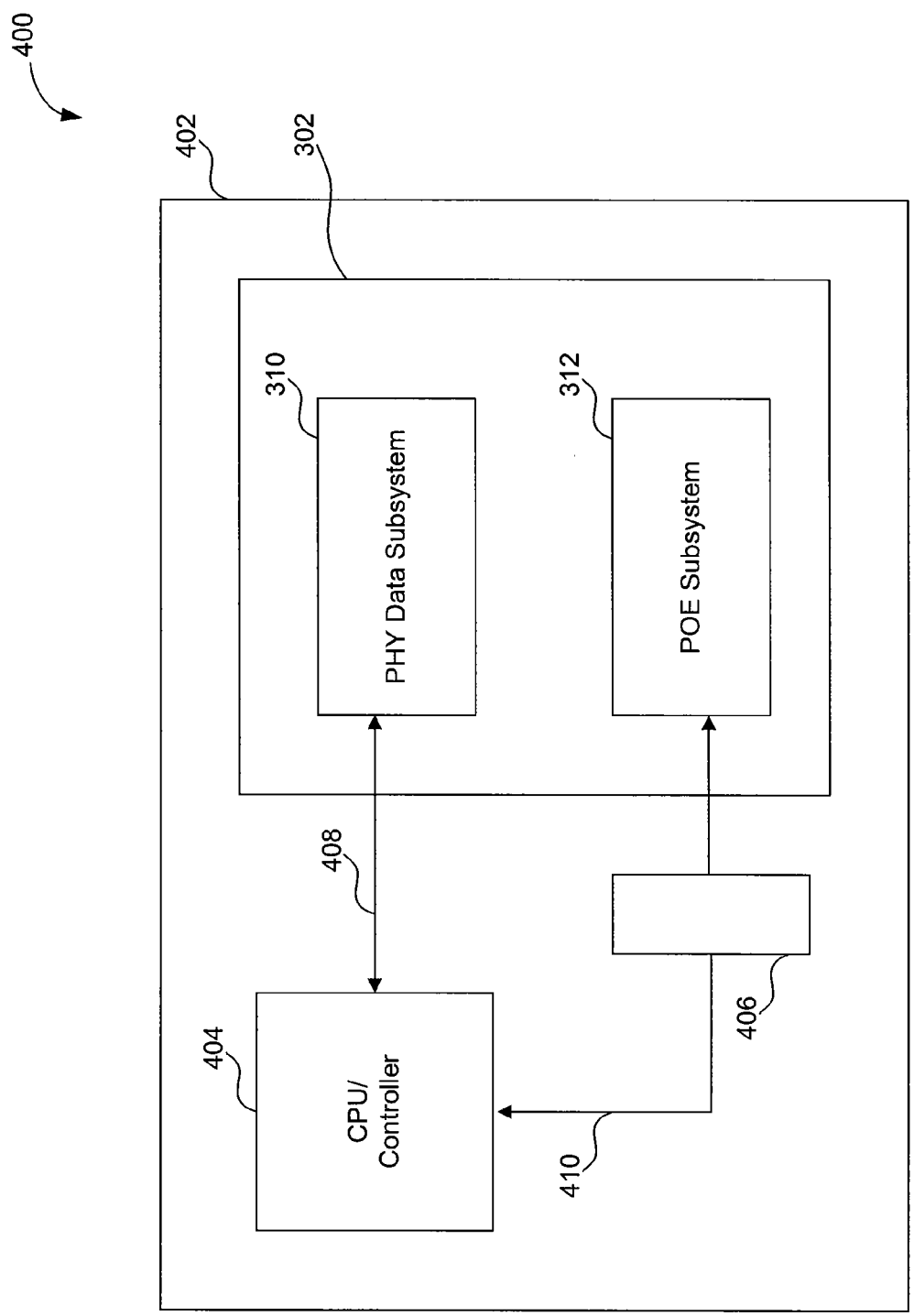
FIG. 4 illustrates an example printed circuit board (PCB) having a PoE system.

The CPU/Controller may be located on the same printed circuit board (PCB) as the PoE system. For example, as shown in FIG. 4, PCB 402 includes PoE system 302 and a CPU/Controller 404. PCB 402 may represent a linecard with a single PCB, which is generally used as part of a chassis-based switch configuration, or a stackable unit with a single PCB, which is generally used as part of a stackable-based switch configuration (commonly known as pizza box). Note that a linecard or a stackable unit may include one or more PCBs such as PCB 402, for example.

Alternatively, the CPU/Controller 404 may be located externally to the PoE system 302. For example, in a chassis-based implementation, a centralized CPU/Controller is located in a supervisory slot of the chassis and controls one or more Ethernet and/or PoE linecards located on different slots of the chassis.

Regardless of the location of the CPU/Controller relative to the PoE system, at least two distinct communication buses are needed in conventional systems for the CPU/Controller to communicate with the isolated side and the non-isolated side of the PoE system. This communication and control architecture, again, is necessitated by the different power requirements between the isolated and non-isolated sides of the PoE system.

For example, in the single PCB-single PoE implementation 400 of FIG. 4, two separate communication buses 408 and 410 connect CPU/Controller 404 respectively to PHY/Data subsystem 310 and PoE subsystem 312 of PoE linecard 302. Communication bus 408 may be an out-of-band communication and management channel, separate from a data channel that is generally available between CPU/Controller 404 and PHY/Data subsystem 310. Similarly, communication bus 410 is a communication and management channel for PoE subsystem 312. Note that communication bus 410 may need to cross an isolation barrier to reach PoE subsystem 312. As described above, this can be done via an isolation device 406.

Similarly, in a multiple PoE implementation, at least two separate communication buses will be needed to couple the CPU/Controller to the PHY/Data subsystems and the PoE subsystems of the multiple PoE linecards/stackables. In an embodiment, two communication buses are used and implemented as shared buses, with one bus serving the PHY/Data subsystems and the other serving the PoE subsystems. However, the two communication buses cannot be combined due to the different power requirements between the PHY/Data and the PoE subsystems. In an alternative embodiment, two dedicated buses for each linecard/stackable unit are used, thereby resulting in 2×N buses in an N linecards/stackable-based system. In either embodiment, the CPU/Controller will need to run at least two different addressing schemes and enable at least two different software and hardware control paths to communicate with the PHY/Data and PoE subsystems as the CPU/Controller will handle two distinct buses.

The above described communication and control architectures can also be extended to a chassis-based or a stackable-based switch implementation, in which a centralized CPU/Controller located in a supervisory slot of the chassis/stackable-based switch controls one or more Ethernet and/or PoE linecards/stackable units located on different slots of the chassis/stackable-based switch. A chassis-based implementation 500 is illustrated in FIG. 5. As shown in FIG. 5, chassis-based switch 502 includes a supervisory slot 504a and a plurality of linecard slots 504b-n. Supervisory slot 504a contains a centralized CPU/Controller 512. In another embodiment, chassis-based switch 502 also includes a backup supervisory slot containing a backup CPU/Controller. Line card slots 504b-n each contains a respective Ethernet or PoE linecard. For example, in embodiment 500, linecard slots 504-n respectively contain PoE linecards 302b-n. As above, PoE linecard 302 includes a PHY/Data subsystem 310 and a PoE subsystem 312. Further, linecard 302 may include an isolation device 510, needed to cross the isolation barrier to PoE subsystem 312.

Chassis-based switch implementation 500 implements a dedicated bus communication and control architecture, in which a dedicated communication bus is used for each PHY/Data or PoE subsystem of each linecard in the chassis-based switch. Indeed, as shown in FIG. 5, communication buses 506b-n are each dedicated to serve a respective one of PHY/Data subsystems 310b-n of PoE linecards 302b-n. Similarly, communication buses 508b-n are each dedicated to serve a respective one of PoE subsystems 312b-n of PoE linecards 302b-n.

Accordingly, the number of buses needed in implementation 500 is at least two times the number of linecards in chassis 502. Clearly, this is both an expensive and complex implementation to maintain as the number of linecards increases. While simplification in the number of buses can be achieved by using shared buses, one for PHY/Data subsystems and one for PoE subsystems, as described above, the complexity will remain. For example, referring to FIG. 5, CPU/Controller 512 would still need to access a distinct port to communicate over either shared bus and to address a particular subsystem. This also requires reserving at least two ports on supervisory slot 504a for communication and control. Further, as linecards are added and/or removed from chassis-based switch 502, re-configuration both at CPU/Controller 512 and at the added linecard will be needed, to ensure that CPU/Controller 512 can properly address the added linecard and that the added linecard is properly configured to communicate over the shared bus.

Embodiments of the present invention enable a unified communication and control bus architecture that significantly simplifies communication and control in Ethernet and/or PoE systems. In particular, embodiments enable a unified communication and control architecture with a single bus for controlling all subsystems in an Ethernet and/or PoE system, notwithstanding differences between the subsystems. For example, embodiments allow for the use of a single bus to communicate with both PHY/Data subsystems and PoE subsystems in a PoE system, notwithstanding the different power requirements between the two types of subsystems.

Figure 6:
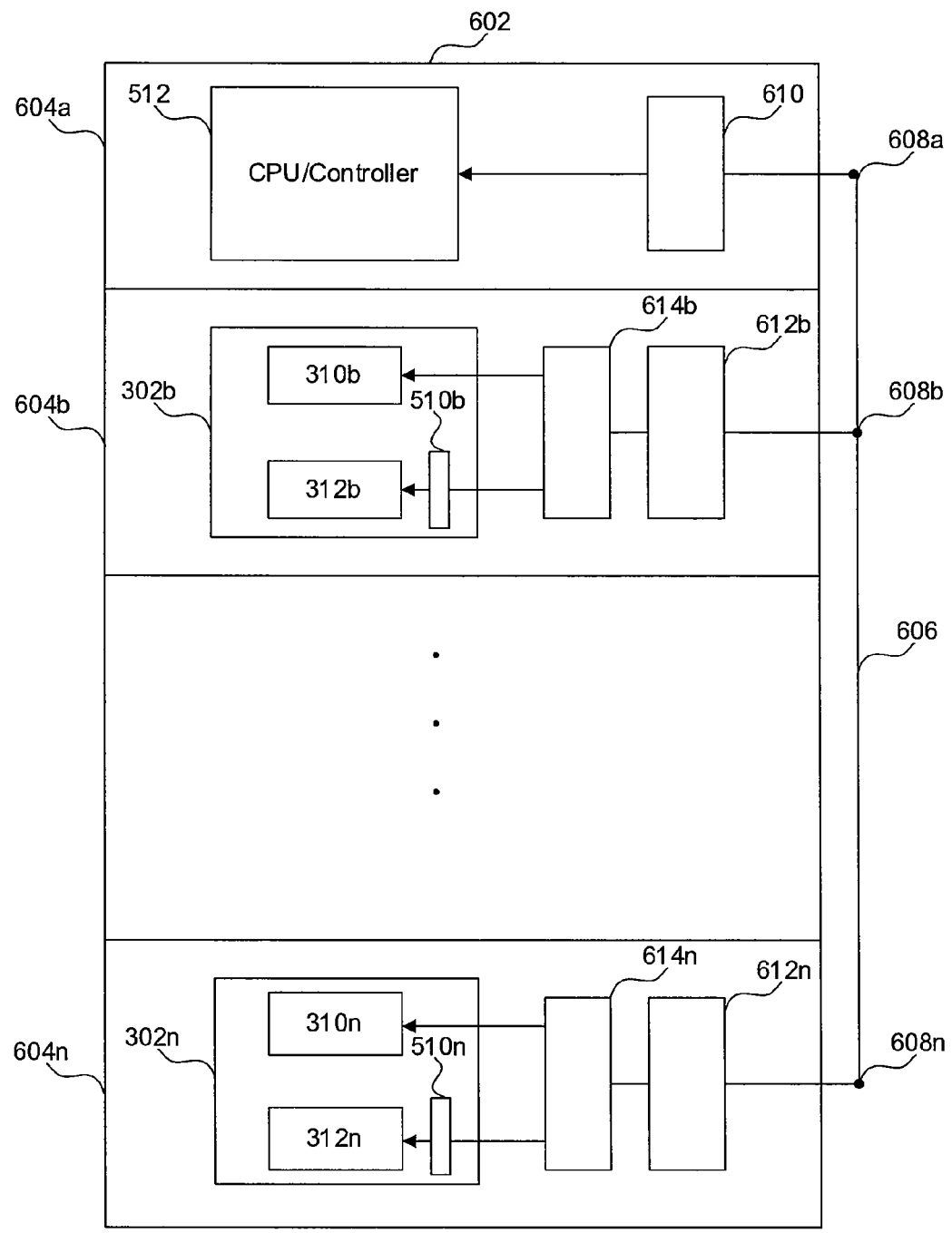
FIG. 6 illustrates a unified communication and control bus architecture, according to an embodiment of the present invention.
Figure 7:
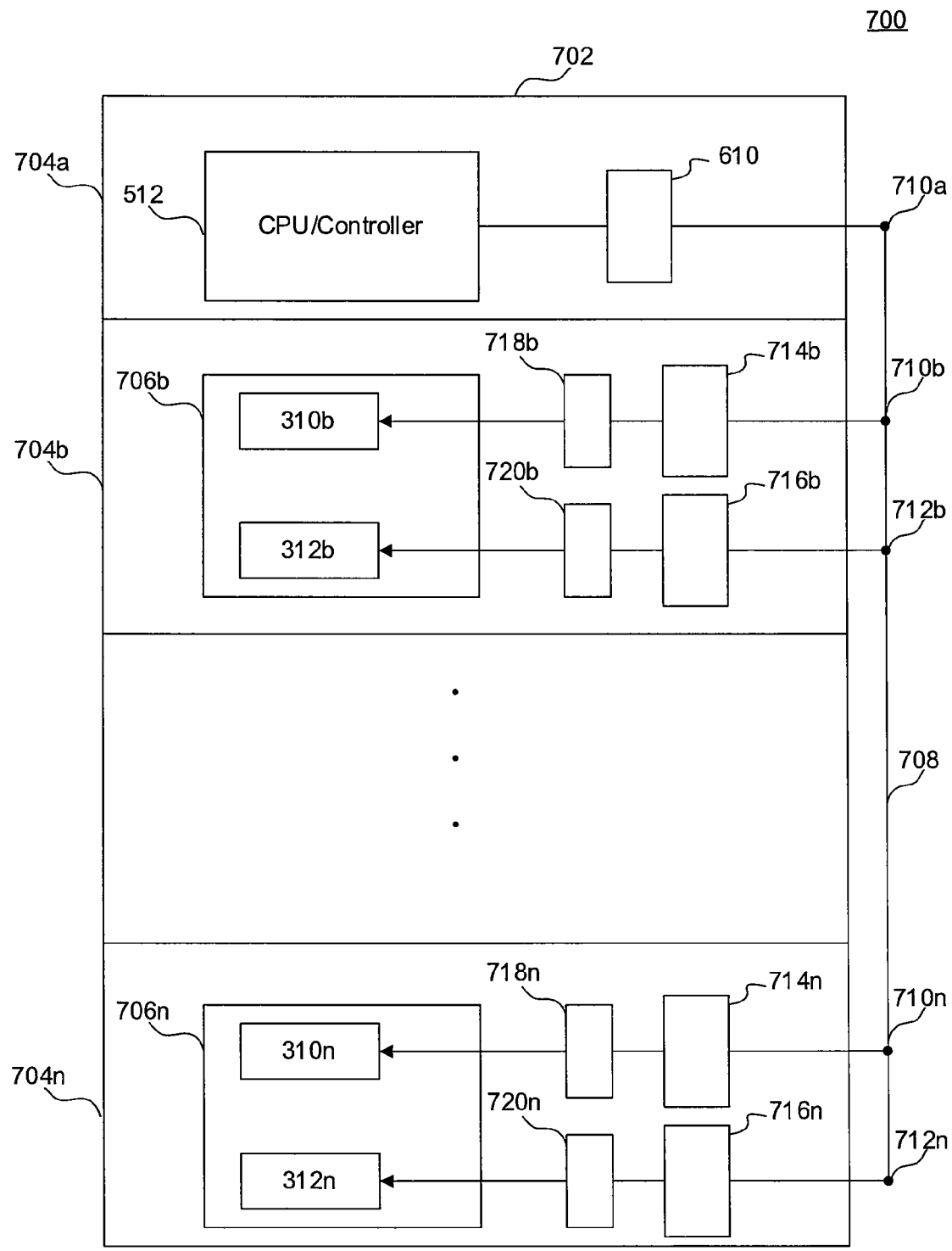
FIG. 7 illustrates a unified communication and control bus architecture, according to an embodiment of the present invention.
Figure 8:
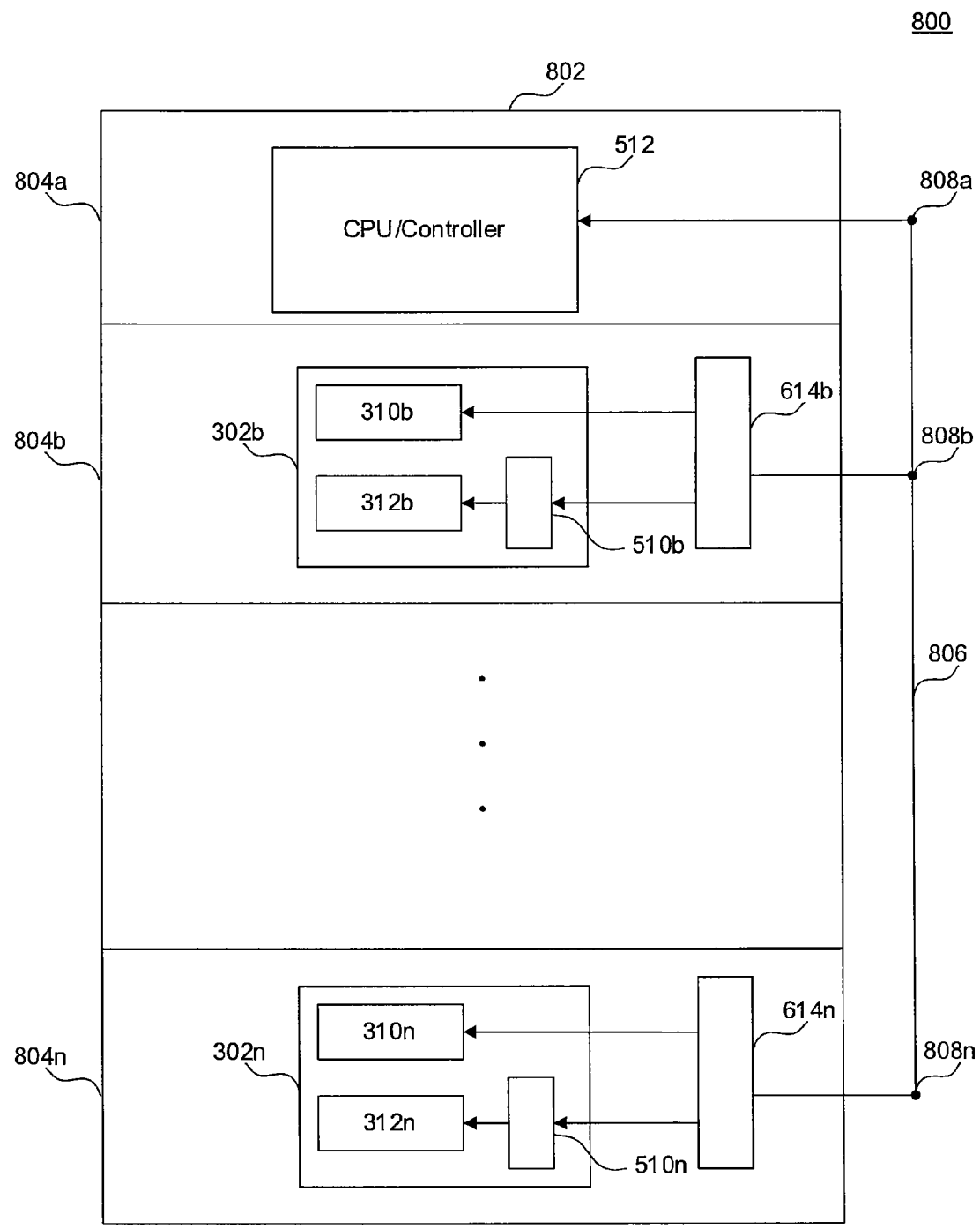
FIG. 8 illustrates a unified communication and control bus architecture, according to an embodiment of the present invention.
Figure 9:
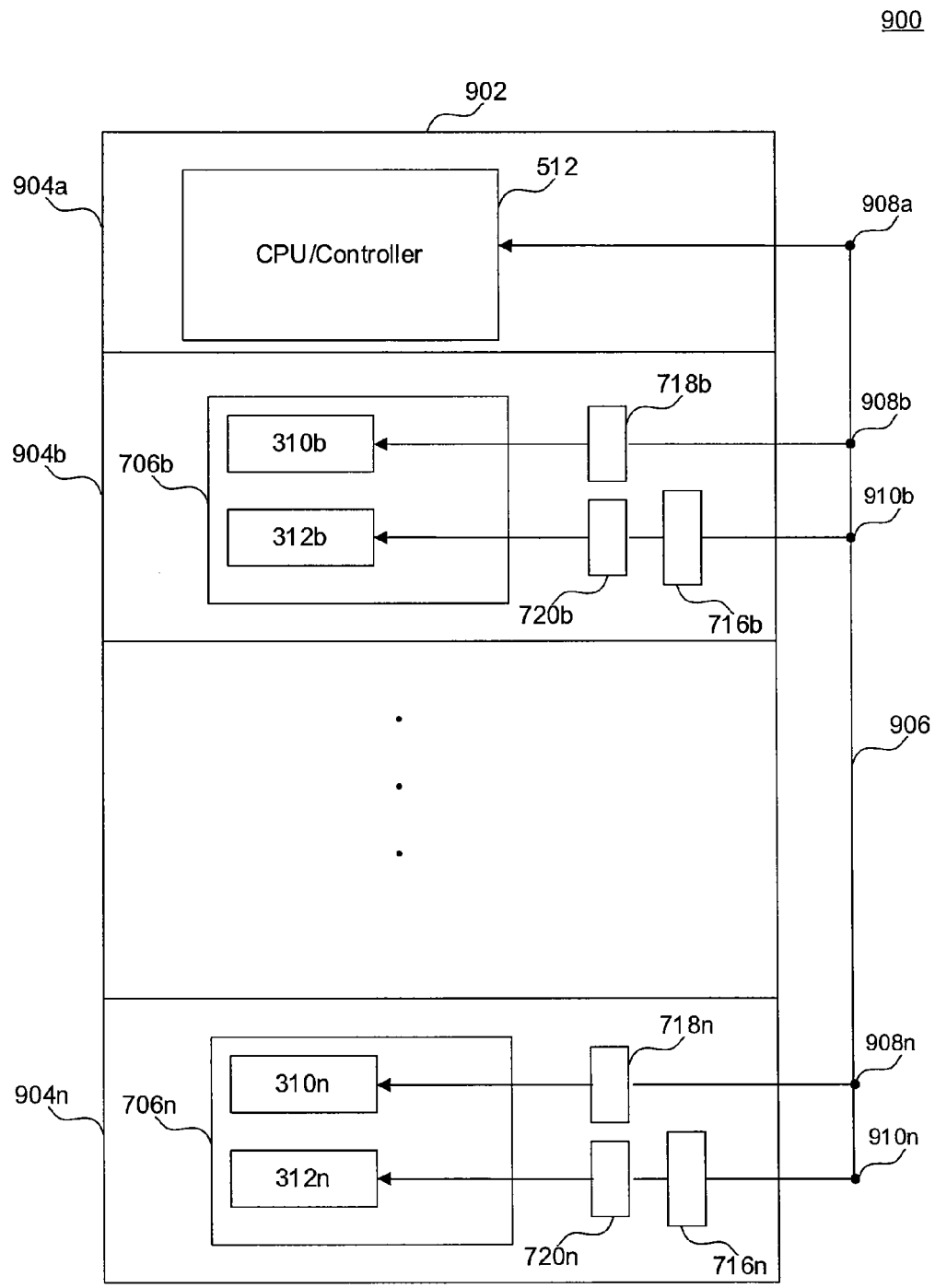
FIG. 9 illustrates a unified communication and control bus architecture, according to an embodiment of the present invention.

According to embodiments of the present invention, the unified communication and control architecture employs a single bus that implements an Ethernet or an Ethernet-like standard. Several implementations of the unified communication and control architecture according to embodiments of the present invention will be presented below. These implementations are provided for the purpose of illustration only and are not limiting of the scope of embodiments of the present invention. Further, although the implementations will be described with reference to chassis-based switch implementations, embodiments of the present invention are not limited as such and can be readily implemented in stackable-based switch implementations, for example. As will be further described below, generally, the implementations differ with respect to the number of bus tap points per linecard as well as the isolation implemented between the supervisory slot and the linecard slots. For example, FIGS. 6 and 7 illustrate implementations according to embodiments of the present invention with full isolation (according to the Ethernet standard) between the supervisory slot and the linecard slots. In contrast, FIGS. 8 and 9 illustrate implementations according to embodiments of the present invention with no isolation between the supervisory slot and the linecard slots.

FIG. 6 illustrates a unified communication and control bus architecture 600 according to an embodiment of the present invention. Embodiment 600 will be described with reference to a chassis-based switch implementation, but can be readily implemented in a stackable-based switch implementation (i.e., pizza box implementation).

As shown in FIG. 6, chassis-based switch 602 includes a supervisory slot 604a and a plurality of linecard slots 604b-n. As in implementation 500, supervisory slot 604a includes a centralized CPU/Controller 512, and linecard slots 604b-n each includes a respective Ethernet and/or PoE linecard 302. In contrast to implementation 500, however, architecture 600 uses a single bus 606 for communication and control between centralized CPU/Controller 512 and PHY/Data subsystems 310b-n and PoE subsystems 312b-n on linecards 302b-n.

According to embodiment 600, full isolation is implemented between centralized CPU/Controller 512 and linecards 302b-n. In an embodiment, isolation is implemented according to the Ethernet standard requirements, which impose a high degree of isolation between anything attached to the Ethernet cable (i.e., linecards 302b-n) and any circuitry sending and receiving transmissions over that cable (i.e., CPU/Controller 512). In an embodiment, isolation is achieved by a way of an isolation device 610, which may include an isolation transformer, for example.

With full isolation between CPU/Controller 512 and linecards 302b-n, CPU/Controller 512 will have a floating output as seen from linecards 302b-n. As such, logic re-referencing will be needed between the CPU/Controller side of the interface and the PHY/Data or PoE side of the interface. In an embodiment, this can be done using re-referencing circuitry 612 for re-referencing the output of CPU/Controller 512 from a first logic environment to a second logic environment. The second logic environment may be either that of PHY/Data subsystem 310 or that of PoE subsystem 312 (note that PHY/Data subsystem 310 and PoE subsystem 312 have different logic environments).

In embodiment 600, re-referencing circuitry 612 re-references the output of CPU/Controller 512 to the logic environment of PHY/Data subsystem 310. As such, no further isolation is needed beyond re-referencing circuitry 612 in the path to PHY/Data subsystem 310. However, isolation will be needed in the path to PoE subsystem 312 and is provided by isolation device 510. Alternatively, re-referencing circuitry 612 can be configured to re-reference the output of CPU/Controller 512 to the logic environment of PoE subsystem 312. As such, no further isolation would be needed beyond re-referencing circuitry 612 in the path to PoE subsystem 312, but isolation will be needed in the path to PHY/Data subsystem 310 (i.e., isolation device 510 would be moved to the PHY/Data subsystem path, instead of the PoE subsystem path)

Embodiment 600 represents a single bus tap point per linecard implementation, with a single bus tap point 608 used for each linecard slot 604. As such, a single bus controller subsystem 614 is needed per linecard slot. In an embodiment, bus controller subsystems 614b-n enable bus access arbitration between CPU/Controller 512, PHY/Data subsystems 310b-n, and PoE subsystems 312b-n. Further, each bus controller subsystem 614b-n acts to examine frames communicated over bus 606 and to forward to its respective subsystem(s) frames addressed thereto. In an embodiment, bus controller subsystem 614 includes multiple outputs in the direction of the linecard with embedded circuitry that switches a received frame onto the appropriate output according to whether the frame is intended for the PHY/Data or the PoE subsystem of the linecard. In an embodiment, bus controller subsystems 614b-n each includes an Ethernet bus controller subsystem.

Figure 10:
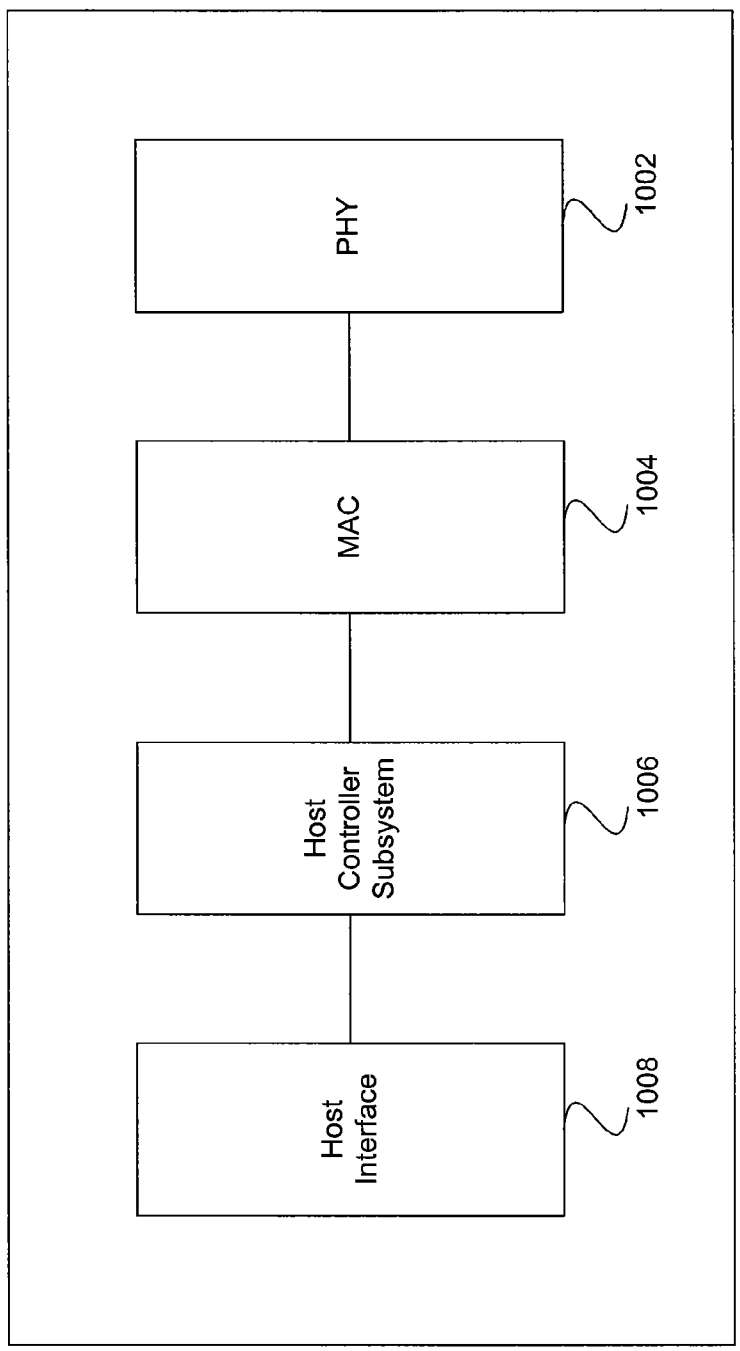
FIG. 10 illustrates an example bus controller subsystem according to an embodiment of the present invention.

An example bus controller subsystem according to an embodiment of the present invention is illustrated in FIG. 10. As shown in FIG. 10, bus controller subsystem 1000 includes a physical layer (PHY) module 1002, a medium access layer (MAC) module 1004, a host controller subsystem 1006, and a host interface module 1006. In an embodiment, host controller subsystem 1006 includes programmable logic, which may be implemented using field programmable gate array (FPGA) logic, for example. In an embodiment, host interface module 1006 includes a PCI (Peripheral Component Interconnect) interface.

In an embodiment, bus 606 is a shared bus that unifies all the communication and control buses that are conventionally needed to connect supervisory slot 604a to linecard slots 604b-n into a single bus at the backplane of chassis-based switch 602. In an embodiment, bus 606 implements a shared access protocol, such as CSMA/CD (Carrier Sense Multiple Access/Collision Detection), for example. Accordingly, bus 606 is implemented as a multi-drop interface as shown in embodiment 600, with CPU/Controller 512, PHY/Data subsystems 310b-n, and PoE subsystems 312b-n attached to bus 606 through respective tap points 608a, 608b-n, and 608b-n. Alternatively, other shared access protocols may also be used, including, for example, token-based reservation protocols. Further, other shared bus topologies may also be used, including, for example, ring topologies.

As would be understood by a person skilled in the art based on the teachings herein, architecture 600 is not limited to the embodiment shown in FIG. 6. Indeed, architecture 600 may also be used in single PCB-single PoE, single PCB-multiple PoE, and stackable-based switch implementations.

In an embodiment, bus 606 enables a local area network (LAN) that implements IEEE 802.3 (the Ethernet standard) and operates according to the half-duplex mode of operation of the Ethernet standard. Thus, bus 606 also implements CSMA/CD as a shared access protocol. In an embodiment, bus 606 implements one of 1000BASE-KX, 10 GBASE-KX4, and 10 GBASE-KR. Further, bus 606 may use any of the shielded twisted pair cabling standards.

FIG. 7 illustrates another unified communication and control bus architecture 700 according to an embodiment of the present invention.

Embodiment 700 will be described with reference to a chassis-based switch implementation, but can be readily implemented in a stackable-based switch implementation (i.e., pizza box implementation).

Embodiment 700 is similar to embodiment 600 described above in that it also uses full isolation between CPU/Controller 512 and linecards 706b-n of chassis-based switch 702. However, as shown in FIG. 7, embodiment 700 uses two bus tap points 710 and 712 per linecard slot 704. As such, in an embodiment, two re-referencing circuits 714 and 716 are used for each linecard slot 704, in order to re-reference the output of CPU/Controller 512 from the logic environment of CPU/Controller 512 to logic environments compatible with PHY/Data subsystem 310 and PoE subsystem 312, respectively. Similarly, two bus controller subsystems 718 and 720 are used per linecard slot 704, with each bus controller subsystem dedicated to either PHY/Data subsystem 310 or PoE subsystem 312.

In an embodiment, bus 708 enables a local area network (LAN) that implements IEEE 802.3 (the Ethernet standard) and operates according to the half-duplex mode of operation of the Ethernet standard. In an embodiment, bus 708 implements one of 1000BASE-KX, 10 GBASE-KX4, and 10 GBASE-KR. In an embodiment, bus controller subsystems 718b-n and 720b-n enable bus access arbitration between CPU/Controller 512, PHY/Data subsystems 310b-n, and PoE subsystems 312b-n. Further, each bus controller subsystem 718b-n or 720b-n acts to examine frames communicated over bus 708 and to forward to its respective subsystem(s) frames addressed thereto. In an embodiment, bus controller subsystems 718 and 720 include Ethernet bus controller subsystems.

FIG. 8 illustrates another unified communication and control bus architecture 800 according to an embodiment of the present invention. Embodiment 800 will be described with reference to a chassis-based switch implementation, but can be readily implemented in a stackable-based switch implementation (i.e., pizza box implementation).

Embodiment 800 has similar bus topology to embodiment 500 described above. However, embodiment 800 opts for no isolation between CPU/Controller 512 and linecards 302b-n of chassis-based switch 802. Note that this implementation may not be fully compliant with Ethernet or Ethernet-like standards, which impose isolation requirements. However, since CPU/Controller 512 and PHY/Data subsystems 310b-n typically have common power levels, this implementation can be appropriate with isolation needed only in the paths between CPU/Controller 512 and PoE subsystems 312b-n. In embodiment 800, this is achieved using isolation devices 510b-n, coupled respectively between bus controller subsystems 614b-n and PoE subsystems 312b-n.

Embodiment 800 is a single bus tap point per linecard implementation, with each linecard 302b-n having a single respective bus tap point 808b-n. Accordingly, a single Ethernet bus controller subsystem 614 is needed for each linecard 302b-n.

In an embodiment, bus 806 enables a local area network (LAN) that implements IEEE 802.3 (the Ethernet standard) and operates according to the half-duplex mode of operation of the Ethernet standard. In an embodiment, bus 806 implements one of 1000BASE-KX, 10 GBASE-KX4, and 10 GBASE-KR.

In an embodiment, bus controller subsystems 614b-n enable bus access arbitration between CPU/Controller 512, PHY/Data subsystems 310b-n, and PoE subsystems 312b-n. Further, each bus controller subsystem 614b-n acts to examine frames communicated over bus 806 and to forward to its respective subsystem(s) frames addressed thereto. In an embodiment, bus controller subsystems 614b-n include Ethernet bus controller subsystems.

FIG. 9 illustrates another unified communication and control bus architecture 900 according to an embodiment of the present invention. Embodiment 800 will be described with reference to a chassis-based switch implementation, but can be readily implemented in a stackable-based switch implementation (i.e., pizza box implementation).

As shown in FIG. 9, embodiment 900 implements two bus tap points 908 and 910 off bus 906 for each linecard slot 904 of chassis-based switch 902. Further, embodiment 900 implements no isolation between CPU/Controller 512 and linecards 706b-n.

Since CPU/Controller 512 and Data/PHY subsystems 310b-n typically have common power levels, there is no need for isolation in the paths that connect them. Indeed, as shown in FIG. 9, it is sufficient to couple a bus controller subsystem 718 between CPU/Controller 512 and PHY/Data subsystems 310b-n. On the other hand, PoE subsystems 312b-n have different logic levels than CPU/Controller 512. As such, isolation devices 716b-n need to be inserted in the path between CPU/Controller 512 and PoE subsystems 312b-n as shown in FIG. 9. Separate bus controller subsystems 720b-n will also be needed for PoE subsystems 312b-n in this two bus tap points per linecard implementation.

In an embodiment, bus 906 enables a local area network (LAN) that implements IEEE 802.3 (the Ethernet standard) and operates according to the half-duplex mode of operation of the Ethernet standard. In an embodiment, bus 906 implements one of 1000BASE-KX, 10 GBASE-KX4, and 10 GBASE-KR.

In an embodiment, bus controller subsystems 718b-n and 720b-n enable bus access arbitration between CPU/Controller 512, PHY/Data subsystems 310b-n, and PoE subsystems 312b-n. Further, each bus controller subsystem 718b-n or 720b-n acts to examine frames communicated over bus 906 and to forward to its respective subsystem(s) frames addressed thereto. In an embodiment, bus controller subsystems 718 and 720 include Ethernet bus controller subsystems.

As would be understood by a person skilled in the art based on the teachings herein, choosing between the different implementations described above in FIGS. 6-9 for a given PoE system depends in large part on the size, cost, and performance requirements of the system.

Accordingly, embodiments of the present invention enable a unified communication and control bus architecture that significantly simplifies communication and control in Ethernet and/or PoE systems. In particular, embodiments enable a communication and control architecture with a single bus for controlling all subsystems in an Ethernet and/or PoE system, notwithstanding differences between the subsystems. For example, embodiments of the present invention allow for the use of a single bus to communicate with both PHY/Data subsystems and PoE subsystems in a PoE system, notwithstanding the different power requirements between the two types of subsystems.

As such, significant savings both in terms of cost and complexity can be achieved as the number of communication and control buses is reduced down to one. For example, with a single communication and control bus according to embodiments of the present invention, a single control structure (i.e., software and hardware control paths, addressing scheme, etc.) is needed to communicate between the system controller and the subsystems, and communication from the controller's perspective is reduced to the single task of addressing frames to their destination. Further, significant savings can be achieved in terms of the number of pins and ports at the system controller and/or at the subsystems that are needed for communication and control.

Embodiments of the present invention can be used in various Ethernet and/or PoE implementations, including, for example, single PCB-single PoE, single PCB-multiple PoE, chassis-based switch, and stackable-based switch configurations. Further, embodiments of the present invention can be implemented using standard Ethernet as well as proprietary implementations.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A Power over Ethernet (PoE) system, comprising:
    a system controller;
    a plurality of data subsystems;
    a plurality of PoE subsystems, wherein each of the plurality of data subsystems is associated with a respective one of the plurality of PoE subsystems and is electrically isolated from said respective one of the plurality of PoE subsystems; and
    a shared communication and control bus that couples said system controller to each of said data subsystems and PoE subsystems.

2. The PoE system of claim 1, wherein at least one of said data subsystems comprises one or more of a transceiver and Ethernet subsystems.

3. The PoE system of claim 1, wherein at least one of said PoE subsystems comprises one or more of a DC power supply and a Power Source Equipment (PSE) controller.

4. The PoE system of claim 1, wherein said system controller, data subsystems, and PoE subsystems are located on a single printed circuit board (PCB).

5. The PoE system of claim 1, wherein said system controller is located on a separate PCB than said data subsystems and PoE subsystems.

6. The PoE system of claim 1, wherein said system controller is located in a supervisory slot of a chassis-based switch, and wherein at least one of said data subsystems and an associated PoE subsystem are located in a respective linecard slot of said chassis-based switch.

7. The PoE system of claim 6, wherein said chassis-based switch is configurable.

8. The PoE system of claim 1, wherein said system controller is located in a supervisory slot of a stackables-based switch, and wherein at least one of said data subsystems and an associated PoE subsystem are located within a stackable unit of said stackables-based switch.

9. The PoE system of claim 1, wherein said shared communication and control bus uses any of the shielded twisting pair cabling standards.

10. The PoE system of claim 1, wherein said shared bus implements a shared access protocol.

11. The PoE system of claim 10, wherein said shared bus implements Carrier Sense Multiple Access/Collision Detection (CSMA/CD).

12. The PoE system of claim 10, wherein said shared bus implements a token-based shared access protocol.

13. The PoE system of claim 1, wherein said shared communication and control bus is a multi-drop bus, wherein each of said system controller, data subsystems, and PoE subsystems is attached to said bus through a respective tap point.

14. The PoE system of claim 1, wherein said shared communication and control bus is a multi-drop bus, and wherein at least one of said data subsystems and an associated PoE subsystem are attached to said bus through a single respective tap point.

15. The PoE system of claim 1, wherein said shared communication and control bus implements IEEE 802.3 (Ethernet).

16. The PoE system of claim 15, wherein said shared communication and control bus operates according to the half-duplex mode of operation of IEEE 802.3.

17. The PoE system of claim 15, wherein said shared communication and control bus implements one of 1000BASE-KX, 10 GBASE-KX4, and 10 GBASE-KR.

18. The PoE system of claim 1, further comprising:
    a plurality of bus controller subsystems that respectively couple said system controller, data subsystems, and PoE subsystems to said shared communication and control bus, wherein said bus controller subsystems enable bus access arbitration between said system controller, data subsystems, and PoE subsystems.

19. The PoE system of claim 18, wherein said bus controller subsystems include Ethernet controller subsystems.

20. The PoE system of claim 1, further comprising:
    a plurality of isolation interfaces, each associated with a corresponding one of said PoE subsystems and coupled between said corresponding one of said PoE subsystems and said shared communication and control bus.

21. The PoE system of claim 1, wherein said system controller is electrically isolated from said data subsystems and PoE subsystems.

22. The PoE system of claim 21, further comprising:
    one or more re-referencing circuits, coupled between said system controller and at least one of said data subsystems and an associated PoE subsystem.

23. The PoE system of claim 1, wherein said system controller is minimally or not electrically isolated from said data subsystems and electrically isolated from said PoE subsystems.

24. The PoE system of claim 1, wherein said shared communication and control bus consists of a single bus.

25. A combined data and power system, comprising:
    a system controller;
    a plurality of data subsystems;
    a plurality of power subsystems, wherein each of the plurality of data subsystems is associated with a respective one of the plurality of power subsystems and is electrically isolated from said respective one of the plurality of power subsystems; and
    a communication and control bus that singly couples said system controller to each of said data subsystems and power subsystems.

* * * * *